(12) United States Patent
Kim et al.

(10) Patent No.: US 12,182,184 B2
(45) Date of Patent: Dec. 31, 2024

(54) METHOD AND APPARATUS FOR QUESTION-ANSWERING USING A DATABASE CONSIST OF QUERY VECTORS

(71) Applicant: 42Maru Inc., Seoul (KR)

(72) Inventors: Dong Hwan Kim, Seoul (KR); Kibong Sung, Seoul (KR); You Kyung Kwon, Seoul (KR); SeongYeop Jeong, Seoul (KR)

(73) Assignee: 42Maru Inc., Seoul (KR)

( * ) Notice: Subject to any disclaimer, the term of this patent is extended or adjusted under 35 U.S.C. 154(b) by 0 days.

(21) Appl. No.: 18/130,164

(22) Filed: Apr. 3, 2023

(65) Prior Publication Data

US 2023/0237084 A1 Jul. 27, 2023

Related U.S. Application Data

(63) Continuation of application No. 16/699,515, filed on Nov. 29, 2019, now Pat. No. 11,620,343.

(51) Int. Cl.
*G06F 16/00* (2019.01)
*G06F 16/332* (2019.01)
*G06F 16/903* (2019.01)
*G06F 18/214* (2023.01)
*G06F 18/22* (2023.01)
*G06N 3/045* (2023.01)

(52) U.S. Cl.
CPC .... *G06F 16/3329* (2019.01); *G06F 16/90348* (2019.01); *G06F 18/214* (2023.01); *G06F 18/22* (2023.01); *G06N 3/045* (2023.01)

(58) Field of Classification Search
None
See application file for complete search history.

(56) References Cited

U.S. PATENT DOCUMENTS

| | | |
|---|---|---|
| 9,582,757 B1 | 2/2017 | Holmes et al. |
| 2012/0323968 A1 | 12/2012 | Yih et al. |
| 2017/0109355 A1 | 4/2017 | Li et al. |
| 2017/0116250 A1 | 4/2017 | Allen et al. |
| 2017/0351677 A1* | 12/2017 | Chaubal ............... G06F 16/248 |
| 2018/0137433 A1* | 5/2018 | Devarakonda ......... G06N 5/022 |
| 2019/0005127 A1 | 1/2019 | Alkov et al. |
| 2019/0205726 A1 | 7/2019 | Khabiri et al. |
| 2019/0377996 A1 | 12/2019 | Cha et al. |
| 2020/0065389 A1 | 2/2020 | Lu et al. |
| 2020/0272938 A1 | 8/2020 | Desmond et al. |
| 2020/0287850 A1 | 9/2020 | Ferrari et al. |
| 2020/0314476 A1 | 10/2020 | Regis et al. |
| 2020/0356604 A1 | 11/2020 | MacDougall |
| 2021/0165791 A1 | 6/2021 | Kim et al. |
| 2021/0165800 A1 | 6/2021 | Kim et al. |

\* cited by examiner

*Primary Examiner* — Tuankhanh D Phan
(74) *Attorney, Agent, or Firm* — Sughrue Mion, PLLC

(57) ABSTRACT

Disclosed herein is a search method performed by a server, including: receiving a user question from a user terminal; generating a user question vector for the user question; selecting similar question candidates based on a similarity to the user question vector; generating an answer to the user question based on the similar question candidates; and transmitting the answer to the user question to the user terminal.

8 Claims, 9 Drawing Sheets

METHOD AND APPARATUS FOR QUESTION-ANSWERING USING A DATABASE CONSIST OF QUERY VECTORS

CROSS REFERENCE TO RELATED APPLICATION

This application is a continuation application of U.S. application Ser. No. 16/699,515 filed on Nov. 29, 2019, the disclosures of which are incorporated by reference in their entireties.

BACKGROUND OF THE INVENTION

The present invention relates to a method of searching for an answer to a user question and presenting the answer to a user.

As a method for a search engine to provide an answer to a user question, a method of providing a search result obtained by searching a database based on text information constituting a user question input by a user has been widely used. However, since a method of expressing a question is different for each user, in a method of providing the search result for the user question based on the text information, a search result is changed according to a skill of the search. In addition, there is a problem that the search engine cannot derive the search result when expression methods of the question input by the user and a question in a question-answer pair stored in the database are different from each other.

SUMMARY OF THE INVENTION

The present disclosure provides a method of efficiently searching for an answer to a user question using a database composed of question vectors.

According to an exemplary embodiment of the present invention, a search method performed by a server includes: receiving a user question from a user terminal; generating a user question vector for the user question; selecting similar question candidates based on a similarity to the user question vector; generating an answer to the user question based on the similar question candidates; and transmitting the answer to the user question to the user terminal.

Questions and question vectors for the questions may be stored in association with each other in a database of the server.

The selecting of the similar question candidates based on the similarity to the user question vector may include selecting questions associated with question vectors whose similarities to the user question vector are higher than a preset reference and which are stored in the database of the server as the similar question candidates.

The generating of the answer to the user question based on the similar question candidates may include: selecting a similar question among the similar question candidates based on a similarity analysis result to the user question vector; and determining an answer to the similar question as the answer to the user question.

The similar question candidate may be selected based on the similarity to the user question vector by a first similarity analysis model, the similar question may be selected based on the similarity analysis result to the user question vector by a second similarity analysis model, and the first similarity analysis model and the second similarity analysis model may be different analysis models.

The second similarity analysis model may be a neural network model learned using first learning data and second learning data, the first learning data may be composed of a first pair of questions and a label indicating that the first pair of questions are similar to each other, and the second learning data may be composed of a second pair of questions and a label indicating that the second pair of questions are dissimilar to each other.

The generating of the answer to the user question based on the similar question candidates may include: determining similarity ranking of candidate questions belonging to the similar question candidates based on a similarity analysis result to the user question vector; selecting a predetermined number of candidate questions as the similarity questions according to the similarity ranking; and generating answers to the similar questions as the answers to the user question.

The generating of the answers to the similar questions as the answers to the user question may include generating the answers to the user question such that the similar questions and the answers to the similar questions are expressed in the user terminal according to the similarity ranking.

According to another exemplary embodiment of the present invention, a search server may include: a processor; and a memory configured to store instructions executed by the processor, wherein the processor executes the instructions to receive a user question from a user terminal, generate a user question vector for the user question, select similar question candidates based on a similarity to the user question vector, generate an answer to the user question based on the similar question candidates, and transmit the answer to the user question to the user terminal.

According to still another exemplary embodiment of the present invention, a computer program stored in a computer-readable storage medium includes: receiving a user question from a user terminal; generating a user question vector for the user question; selecting similar question candidates based on a similarity to the user question vector; generating an answer to the user question based on the similar question candidates; and transmitting the answer to the user question to the user terminal.

DETAILED DESCRIPTION OF THE PREFERRED EMBODIMENTS

The following description exemplifies only a principle of the present invention. Therefore, those skilled in the art may implement the principle of the present invention and invent various apparatuses included in the spirit and scope of the present invention although not clearly described or illustrated in the present disclosure. In addition, it is to be understood that all conditional terms and exemplary embodiments mentioned in the present disclosure are obviously intended only to allow those skilled in the art to understand a concept of the present invention in principle, and the present invention is not limited to exemplary embodiments and states particularly mentioned as such.

The objects, features, and advantages described above will become more obvious from the following detailed description provided in relation to the accompanying drawings. Therefore, those skilled in the art to which the present invention pertains may easily practice the technical spirit of the present invention.

In the disclosure and the claims, terms such as "first", "second", "third", "fourth", and the like, if any, will be used to distinguish similar components from each other and be used to describe a specific sequence or a generation order, but are not necessarily limited thereto. It will be understood that these terms are compatible with each other under an appropriate environment so that exemplary embodiments of the present invention set forth herein may be operated in a sequence different from a sequence illustrated or described herein. Likewise, in a case where it is described herein that a method includes a series of steps, the order of these steps suggested herein is not necessarily the order in which these steps may be executed, and any described step may be omitted and/or any other step that is not described herein may be added to the method.

In addition, in the disclosure and the claims, terms such as "left", "right", "front", "rear", "top", "bottom", "over", "under", and the like, do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. A term "connected" used herein is defined as being directly or indirectly connected in an electrical or non-electrical manner. Here, targets described as being "adjacent to" each other may be in physical contact with each other, be physically close to each other, or be in the same general range or region, in the context in which the above phrase is used. Here, a phrase "in an exemplary embodiment" means the same exemplary embodiment, but is not necessarily limited thereto.

In addition, in the disclosure and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present disclosure are used only in order to easily make the disclosure. Therefore, these terms do not have meanings or roles that distinguish from each other in themselves.

In addition, terms used in the present disclosure are for describing exemplary embodiments rather than limiting the present invention. In the present disclosure, a singular form includes a plural form unless explicitly stated otherwise. Components, steps, operations, and/or elements mentioned by terms "comprise" and/or "comprising" used in the disclosure do not exclude the existence or addition of one or more other components, steps, operations, and/or elements.

Further, in describing the present invention, in the case in which it is determined that a detailed description of the well-known technology related to the present invention may unnecessarily makes the gist of the present invention unclear, it will be omitted. Hereinafter, exemplary embodiments of the present invention will be described in detail with reference to the accompanying drawings.

Figure 1A:
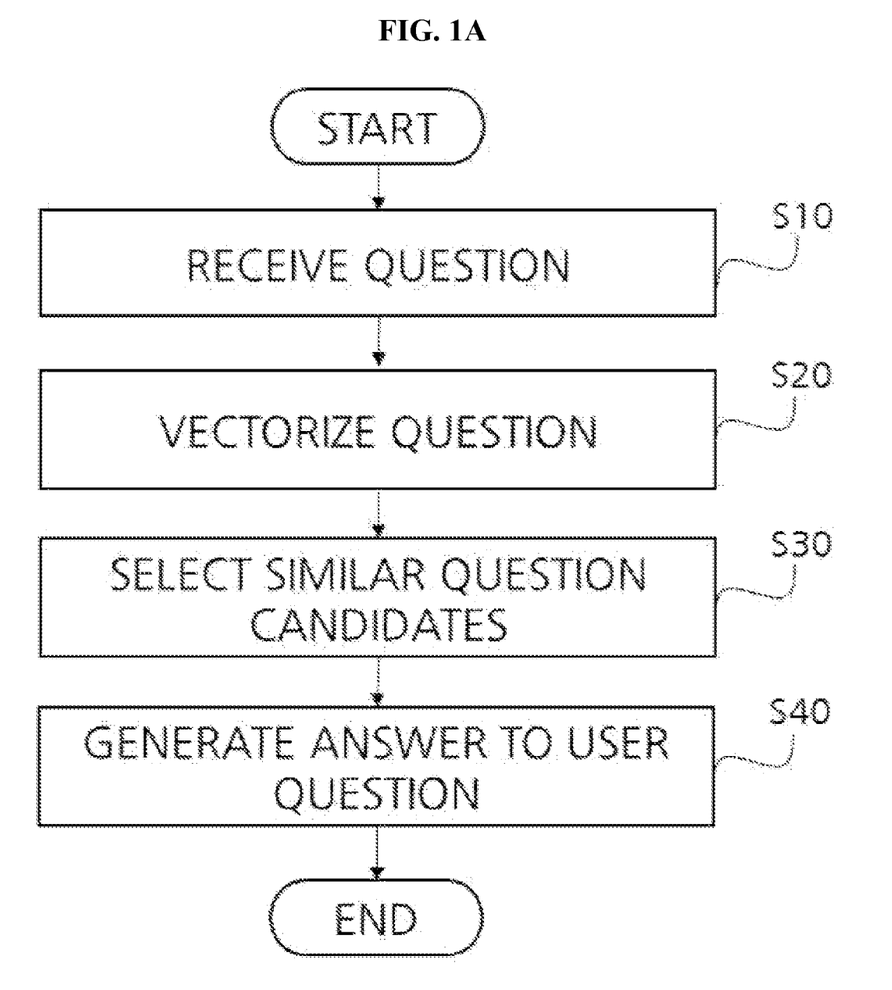
FIG. 1A is a flowchart for describing a search method performed by a server according to an exemplary embodiment of the present disclosure.

FIG. 1A is a flowchart for describing a search method performed by a server according to an exemplary embodiment of the present disclosure. First, a server receives a user question from a user terminal (S10). Then, the server vectorize the question by generating a user question vector for the user question (S20). Then, the server selects similar question candidates based on a similarity to the user question vector (S30). Then, the server generates an answer to the user question based on the similar question candidates (S40).

Figure 1B:
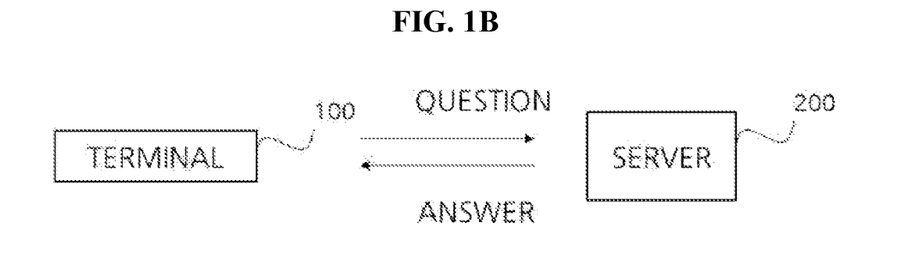
FIG. 1B is a block diagram illustrating a search system according to an exemplary embodiment of the present invention.

FIG. 1B is a block diagram illustrating a search system according to an exemplary embodiment of the present invention. The search system according to an exemplary embodiment includes a user terminal 100 and a search server 200. Hereinafter, for convenience of explanation, the user terminal 100 will be abbreviated as a terminal 100, and the search server 200 will be abbreviated as a server 200.

The terminal 100 according to an exemplary embodiment transmits a question to the server 200, and receives an answer to the question from the server 200. The terminal 100 provides an answer to a user question based on the answer to the question received from the server 200.

The server 200 may be a search engine performing an elastic search based on a keyword. In an exemplary embodiment, the server 200 may search for a similar question based on a vector. Therefore, the server 200 may select a question having a high similarity to the user question and provide the selected question to the terminal 100. The server 200 primarily selects a similar question candidate group for the user question, and the terminal 100 performs similarity evaluation on questions belonging to the similar question candidate group provided by the server 200, such that the terminal 100 may limit the number of questions whose similarities to the user question should be analyzed in order to select similar questions similar to the user question to a predetermined range.

Figure 2:
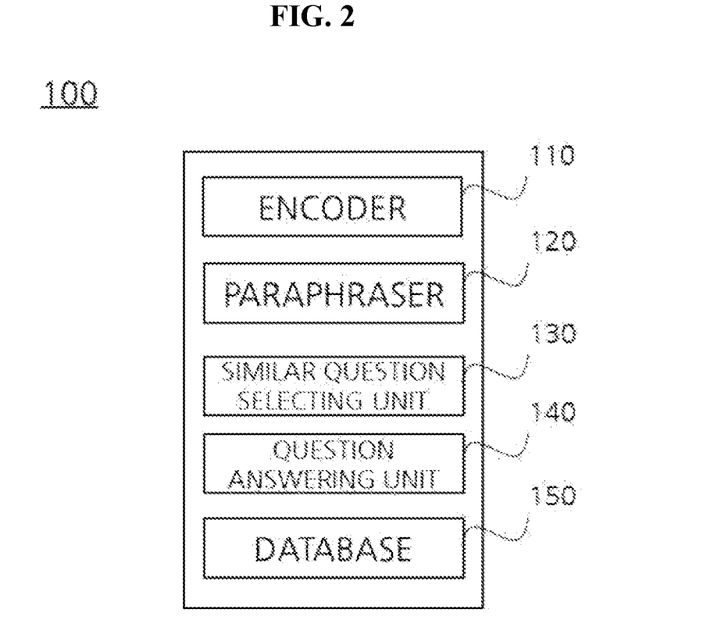
FIG. 2 is a block diagram illustrating a terminal and a server according to an exemplary embodiment of the present invention.

FIG. 2 is a block diagram illustrating the terminal 100 according to an exemplary embodiment of the present invention. The terminal 100 according to an exemplary embodiment of the present invention may be configured to include an encoder 110, a paraphraser 120, a similar question selecting unit 130, a question answering unit 140, and a database 150.

The encoder 110 generates an embedding vector corresponding to a user question expressed in natural language. The embedding vector is a vector indicating a structure and the meaning of the user question expressed in natural language. The encoder 110 may be composed of a neural network, and may be a neural network model learned in order to generate the embedding vector.

The paraphraser 120 is a similarity analysis model that analyzes a similarity between a plurality of questions expressed in natural language. The paraphraser 120 receives two natural language questions as an input and provides a similarity value between the questions as an output. For example, the paraphraser 120 may vectorize two questions, and determine the similarity value based on a distance in a Euclidean space or a cosine similarity between vectors for each question. The paraphraser 120 may be configured to include an encoder 110 in order to vectorize a question expressed in natural language. The paraphraser 120 may be composed of a neural network, and may be a neural network model learned in order to determine a similarity between questions.

The similar question selecting unit 130 selects a question similar to the user question according to the similarity obtained by the paraphraser 120. In addition, the similar question selecting unit 130 determines a similarity grade of the similar question according to the order similar to the user question.

The question answering unit 140 obtains the user question from the user. In addition, the question answering unit 140 provides an answer to the user question to the user. In a case where an input user question and an answer to the input user question are stored in the database 150, the question answering unit 140 provides an answer to the input user question to the user. On the other hand, in a case where the input user question is not stored in the database 150, the question answering unit 140 may provide an answer to a similar question corresponding to a similarity grade according to a reference preset according to the similarity grade selected by the similar question selecting unit 130 as a user's answer to the user.

Figure 3:
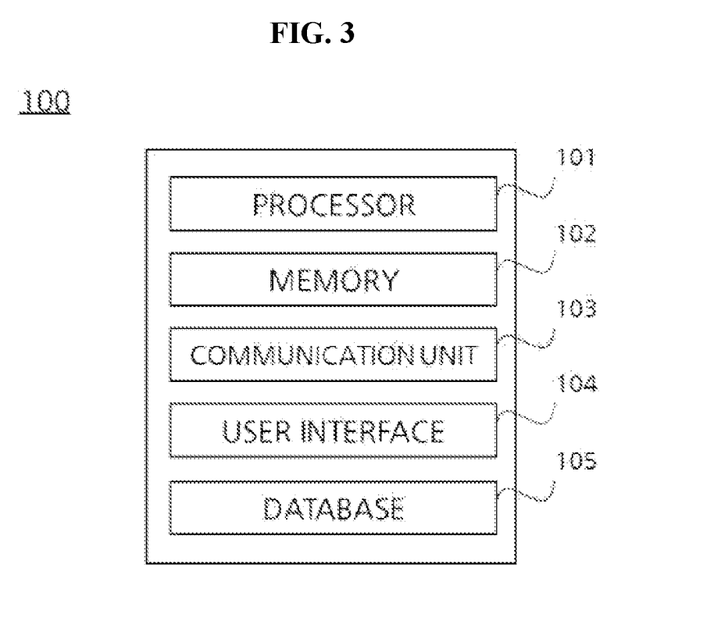
FIG. 3 is a block diagram illustrating a terminal and a server according to an exemplary embodiment of the present invention.

Meanwhile, the terminal 100 and the server 200 according to an exemplary embodiment of the present invention may be configured to include a processor 101, a memory 102, a communication unit 103, a user interface 104, and a database 105, as illustrated in FIG. 3. The memory 102 may store a program for performing an operation of a search method according to an exemplary embodiment of the present invention. The memory 102 may store the neural network model learned to implement the encoder 110 and the paraphraser 120. The processor 101 may process data according to the program and the neural network model stored in the memory 102 to control the communication unit 103, the user interface 104, and the database 105, thereby performing a search method according to an exemplary embodiment of the present invention.

Figure 4:
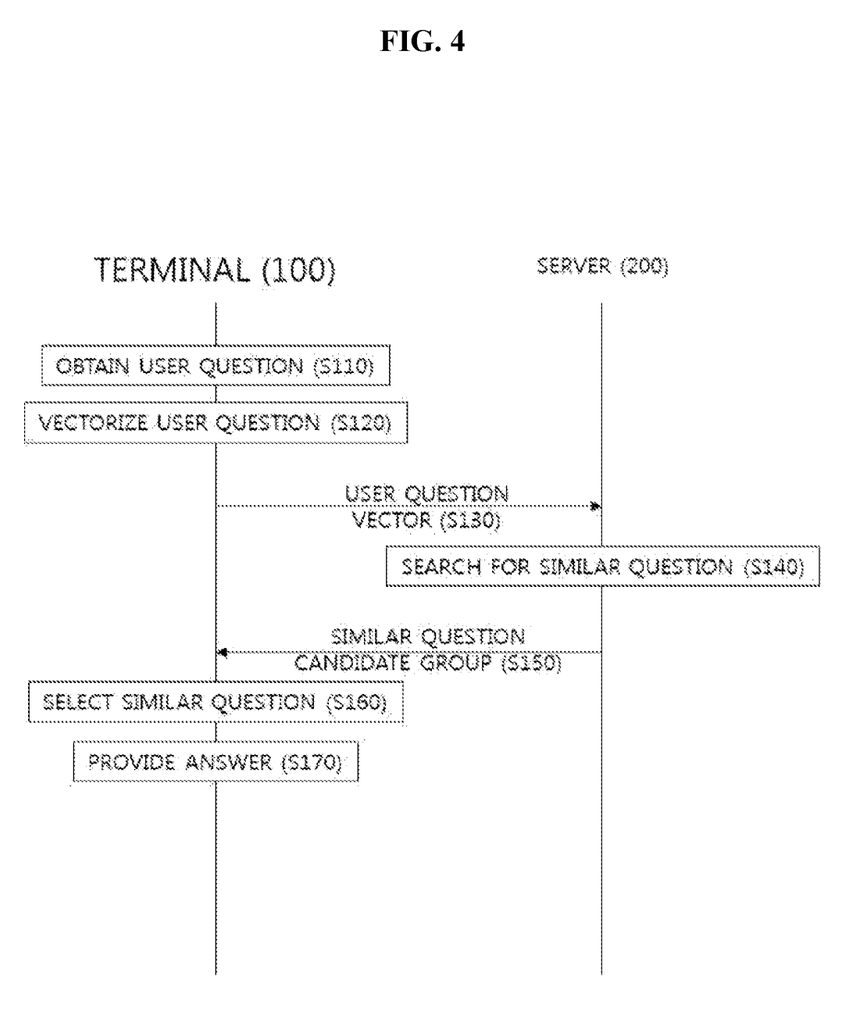
FIG. 4 is a flowchart for describing a search method according to an exemplary embodiment of the present disclosure.

Hereinafter, a search method according to an exemplary embodiment of the present invention will be described. FIG. 4 is a flowchart for describing a search method according to an exemplary embodiment of the present disclosure. The terminal 100 obtains a user question based on a user input (S110). The terminal 100 may obtain the user question by a text input of the user input through a keyboard or a touch pad or a voice input by utterance of the user. The user question may be a sentence expressed in natural language.

Then, the terminal 100 vectorizes the user question expressed in natural language (S120). The terminal 100 may generate a user question vector by converting the user question into a vector expression using the encoder 110. Then, the terminal 100 transmits the user question vector to the server 200 (S130).

The server 200 searches for a similar question using the user question vector received from the terminal 100 (S140). The server 200 searches for a question having a vector that is the same as or similar to the user question vector among questions stored in the database of the server 200. In more detail, questions and answers to the questions may be stored in association with each other in the database of the server 200. For example, question-answer pairs may be stored in the database. In addition, the questions and vectors for the questions may be stored in association with each other in the database. For example, question-answer-question vector pairs may be stored in the database.

The server 200 may determine a vector positioned within a predetermined distance from the user question vector in a Euclidean space as the similar vector in order to search for the question having the similar vector. Alternatively, the server 200 may determine a similarity based on a cosine similarity. The server 200 generates a similar question candidate group using a similar question search result. The similar question candidate group may include only questions or may include at least one of questions, answers, and vectors. In addition, the similar question candidate group may further include similarity values to the user question vector for each question belonging to the similar question candidate group. Furthermore, the similar question candidate group may further include a similarity order between the questions belonging to the similar question candidate group. The server 200 transmits the generated similar question candidate group to the terminal 100 (S150).

Then, the terminal 100 selects a similar question using the similar question candidate group information received from the server 200 (S160). The terminal 100 may select a question similar to the user question among the questions belonging to the similar question candidate group. The terminal 100 may determine a similarity between each of the questions belonging to the similar question candidate group and the input user question using the paraphraser 120. The terminal 100 may select a question having the highest similarity as the similar question. Alternatively, the terminal 100 may select similar questions for each grade by grading the questions belonging to the similar question candidate group in the order of high similarity. A similarity analysis method by the paraphraser 120 may be different from a similarity analysis method performed by the server 200. For example, a similarity analysis model of the paraphraser 120 may be an analysis model different from a similarity analysis model of the server 200, and in a case where these similarity analysis models are neural network models, configurations of the models or values of variables constituting hidden layers may be different from each other.

Then, the terminal 100 provides an answer according to the selected similar question (S170). The terminal 100 may provide an answer corresponding to the similar question having the highest similarity as an answer to the user question input by the user. Alternatively, the terminal 100 may provide an answer corresponding to the question belonging to the similar question candidate group as an answer to the user question input by the user according to a grade of the similar question.

The terminal 100 does not receive all of the answers to the similar question candidate group from the server 200, but may receive only the answer to the selected similar question from the server 200. This may be implemented in such a manner that answer information is not included in the similar question candidate group and the terminal 100 transmits a similar question requiring the answer information to the server 200 and receives an answer to the similar question from the server to receive only the answer to the similar question from the server 200. Therefore, traffic between the terminal 100 and the server 200 may be reduced.

The similar question may be a question having a meaning different from that of the user question. For example, in a case where the user input a question "How much is up to the city hall?", the terminal 100 may select a similar question such as 'How long does it take to reach the city hall?', 'How far is the city hall?' or 'How much does it cost to reach the city hall?' as the similar question. In addition, in a case of the similar question 'How long does it take to reach the city hall?', there may be a similar question such as 'How much does it cost to reach the city hall by a privately-owned car?', 'How much does it cost to reach the city hall by public transportation?', or 'How much does it cost to reach the city hall by walking?'.

In a case of providing only an answer to the similar question to the user, the user may misunderstand an answer to a different meaning as an answer to the user question input by the user. Therefore, in a case where the terminal 100 provides an answer corresponding to the similar question to the user, the terminal 100 may provide an answer to the similar question together with the similar question to the user.

Meanwhile, in the description with reference to FIG. 4, step S130 may be performed by transmitting the user question itself instead of the user question vector to the server 200 by the terminal 100. In this case, the server 200 may generate a user question vector for the user question by using the encoder. In addition, in step S140, the server 200 may search for the similar question using the generated user question vector.

Hereinafter, each step will be described in more detail with reference to the drawings. The terminal 100 and the server 200 according to an exemplary embodiment of the present invention may analyze a natural language to vectorize a question, and store a learned neural network model in order to analyze a similarity between questions in a vector dimension. The neural network model according to an exemplary embodiment may be generated on a scale on which it may be operated according to an application field thereof or a computing capability of an apparatus.

In an exemplary embodiment, the neural network model may be a deep learning model. The deep learning model may be constructed by a plurality of hidden layers. Nodes belonging to the layer may transmit and receive data to and from each other according to a connection relationship between the nodes. The terminal 100 and the server 200 according to an exemplary embodiment of the present invention may generate an analysis model by learning a deep neural network (DNN), a recurrent neural network (RNN), a bidirectional recurrent deep neural network (BRDNN), and the like, and perform the search method according to an exemplary embodiment using the generated analysis model.

Figure 5:
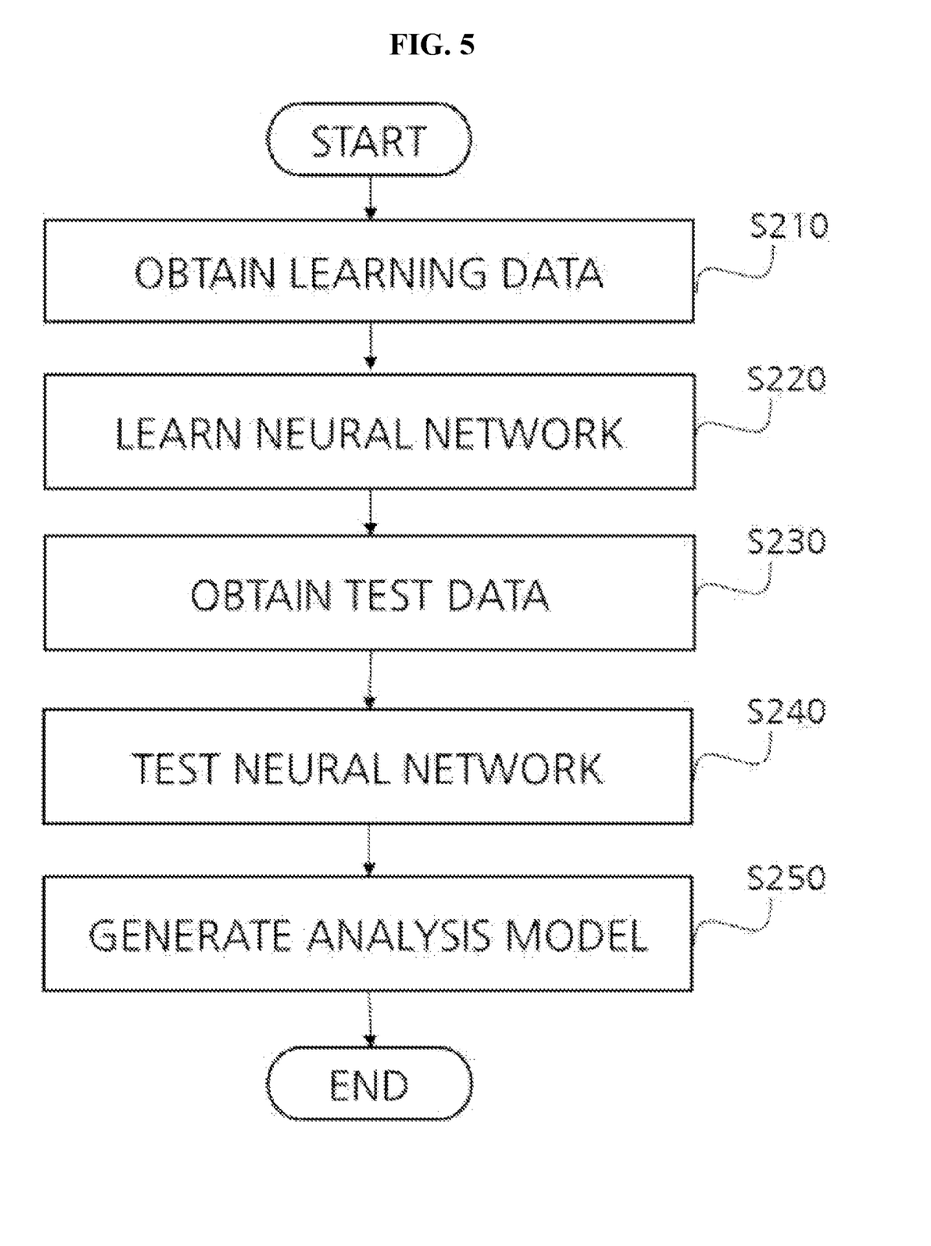
FIG. 5 is a view illustrating an example of a process of learning a neural network to generate an analysis model.

FIG. 5 is a flowchart for describing a process of learning a neural network to generate an analysis model. The encoder 110 and the paraphraser 120 according to an exemplary embodiment may be generated by an analysis model generating apparatus according to an analysis model generating method of FIG. 5. First, the analysis model generating apparatus obtains learning data (S210). The learning data may be set according to an analysis model to be generated.

Figure 6:
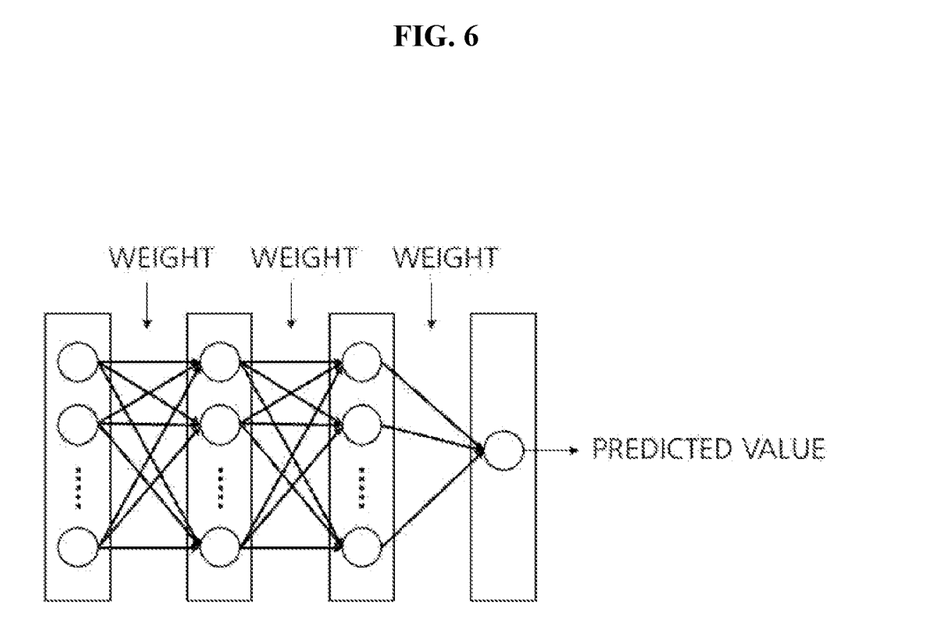
FIG. 6 is a view illustrating an example of a process of learning a neural network to generate an analysis model.

Then, the analysis model generating apparatus learns a neural network using the acquired learning data (S220). This will be described in more detail with reference to FIG. 6. The analysis model generating apparatus may set a neural network model according to the analysis model to be generated and perform forward propagation to determine a predicted value. The analysis model generating apparatus may determine an error value for determining a variable value by comparing the predicted value and an actual value with each other using a loss function. The analysis model generating apparatus may adjust the variable value of the neural network model using backward propagation so that an error between the predicted value and the actual value is reduced. As an optimizer used for the backward propagation, a batch gradient descent method, a stochastic gradient descent method or the like may be used.

After the learning of the neural network is performed, the analysis model generating apparatus acquires test data in order to confirm whether or not the neural network derives a valid analysis result (S230), and tests the neural network using the obtained test data (S240). The test data may be composed of an input value and an actual value depending on the input value. The analysis model generating apparatus may terminate the learning of the neural network in a case where the predicted value, which is a result obtained by applying the input value of the test data to the neural network, has an error value within an allowable error range from the actual value of the test data, and use the learned neural network as the analysis model (S250). On the other hand, in a case where the error value between the predicted value according to an input of the test data and the actual value is out of the allowable error range, the analysis model generating apparatus may continue the learning of the neural network.

Meanwhile, the analysis model generating apparatus may apply early termination or dropout in order to prevent overfitting. In an exemplary embodiment, the analysis model generating apparatus may implement the early termination by setting an epoch before accuracy of verification data is lowered as a learning epoch if it is found that the accuracy of the verification data is continually lowered, while performing monitoring on the error value between a predicted value and an actual value of the verification data. Alternatively, the analysis model generating apparatus may prevent the overfitting by performing dropouts in which selected nodes are not used for the learning according to a predetermined reference. Therefore, the analysis model generating apparatus may prevent the neural network from changing depending on a particular node or combination of nodes.

Figure 7:
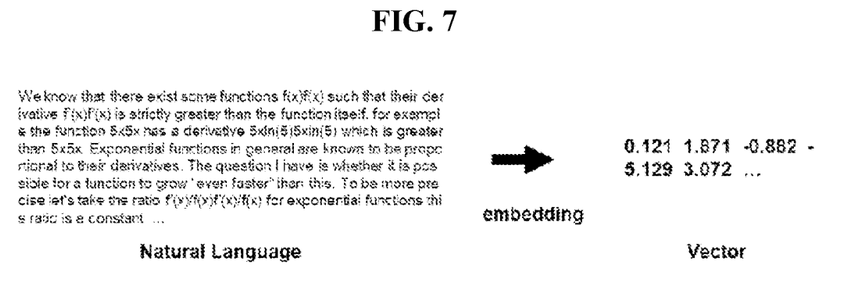
FIG. 7 is a view illustrating an example of embedding a user question expressed in natural language to generate a vector.

Hereinafter, a vectorization method of a question performed by the encoder 110 will be described. The encoder 110 may generate a vector by embedding a user question expressed in natural language as illustrated in FIG. 7. The encoder 110 according to an exemplary embodiment of the present invention is a vector generation model generated using the neural network, and may output a vector value corresponding to a question using the question as an input. The encoder 110 according to an exemplary embodiment may be a model such as Bag of Words (BOW), TF-IDF, Doc2Vec, Text Embedding Encoder, or Word2Vec.

Figure 8:
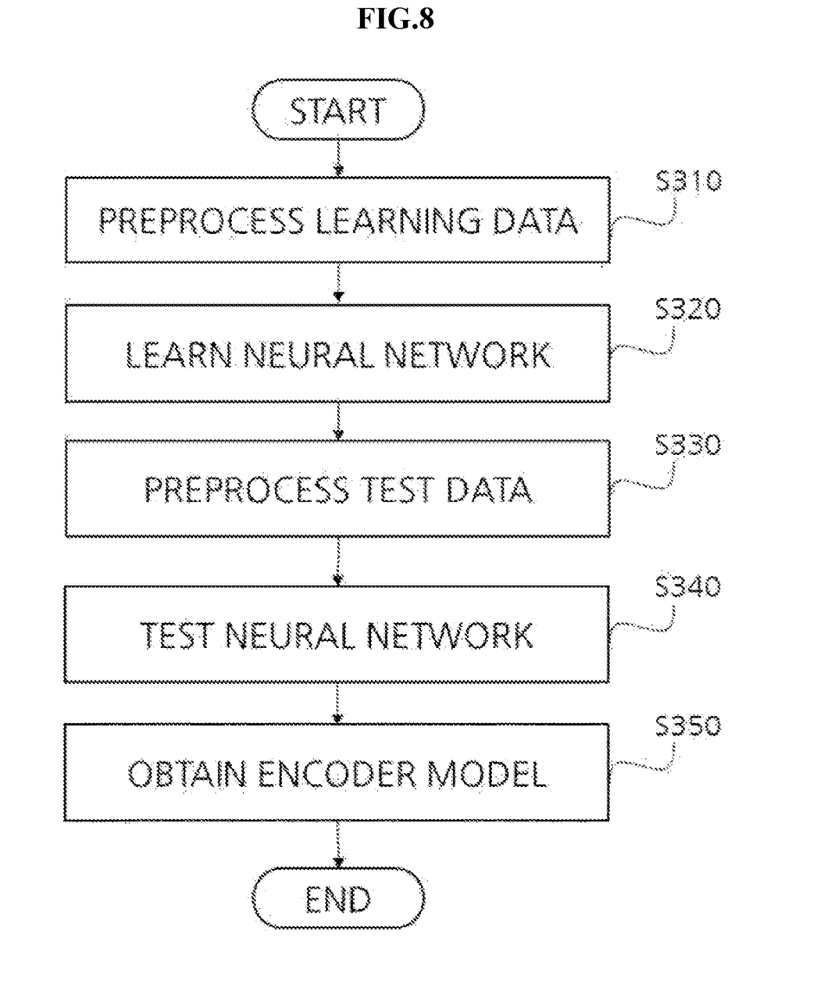
FIG. 8 is a flowchart illustrating a neural network learning process for generating an encoder.

FIG. 8 is a flowchart illustrating a neural network learning process for generating the encoder 110. The analysis model generating apparatus may learn a neural network model such as a DNN or an RNN model using preprocessed learning data S310 (S320), and test the learned neural network model (S330 and S340) to generate an encoder model 110 (S350).

For example, the analysis model generating apparatus may preprocess the learning data before generating the encoder 110. The analysis model generating apparatus may extract a word by performing tokenization on the question. In an exemplary embodiment, the analysis model generating apparatus may perform the tokenization based on a space, a colon, a comma, and the like. Additionally, the analysis model generating apparatus may perform the preprocessing through morphological analysis, stopword elimination or the like.

Next, in an exemplary embodiment, the analysis model generating apparatus may learn a Word2Vec model by applying continuous bag of words (CBOW). The analysis model generating apparatus may generate the encoder 110 model by applying a score vector according to a one-hot vector of the neighboring words and a one-hot vector of a main word to a cross-entropy function, which is a loss function, and modifying a variable of a neural network by performing a learning process so that a value of the loss function becomes close to zero.

Hereinafter, a method of determining a similarity between a pair of questions performed by the paraphraser 120 will be described. The paraphraser 120 is a paraphrase model that outputs a similarity between the pair of questions with respect to an input composed of the pair of questions. The analysis model generating apparatus may construct the paraphrase model by learning the neural network model. The neural network model may be a CNN, a DNN, an RNN, or the like.

The paraphrase model according to an exemplary embodiment may obtain vector expressions of the questions using the encoder 110 described above. The paraphrase model may evaluate a similarity between two questions by evaluating a similarity between the vectors. For example, the paraphrase model may evaluate a similarity between two questions by generating vector expressions of the questions and calculating a distance between two question vectors in a Euclidean space. The paraphrase model may determine that the two questions become similar to each other as the distance between the two question vectors become small.

In another exemplary embodiment, the paraphrase model may evaluate a similarity between the two questions by calculating a cosine similarity between the vector expressions of the two questions. The paraphrase model may determine that the two questions are similar to each other as a value of the cosine similarity becomes close to 1 and the two questions are dissimilar to each other as a value of the cosine similarity becomes close to −1.

Meanwhile, in a case of analyzing the similarity between the questions in the manner as described above, even though questions whose forms are similar to each other, but contents are completely different from each other due to a change in some words are configured, the questions may be analyzed to be similar to each other. For example, a question 'What is the transportation cost from here to the city hall from here?' and a question 'What is the distance from there to the city hall from here?' are composed of the same words except for words 'transportation cost' and 'distance'. Therefore, these questions may be determined to be similar questions by the method of determining a similarity described above.

As such, the paraphraser 120 should be able to identify that questions including similar words but having semantically different contents are dissimilar to each other. The paraphrase model according to an exemplary embodiment may use a Siamese neural network and be learned by supervised learning.

Figure 9:
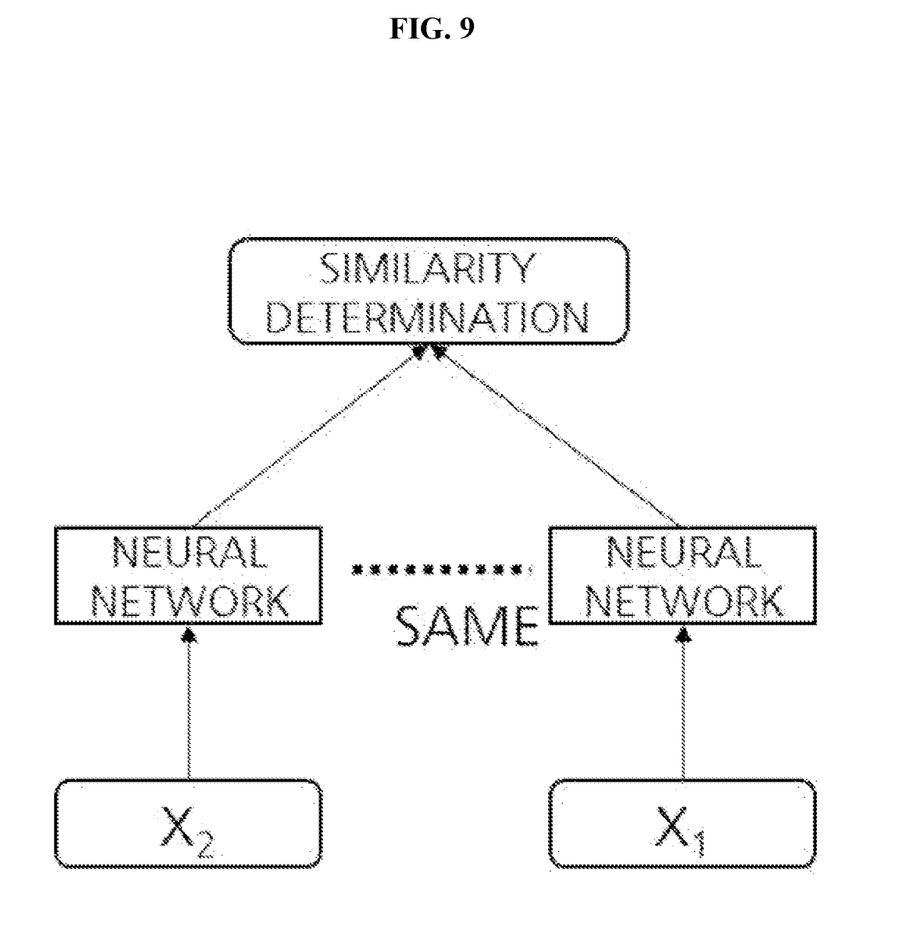
FIG. 9 is a view for describing a concept of a Siamese neural network.

FIG. 9 is a view for describing a concept of a Siamese neural network. The Siamese neural network is composed of the same neural networks. The analysis model generating apparatus may generate the paraphrase model by learning the Siamese neural network while changing variables constituting the Siamese neural network so that similar vectors are generated as result values in a case where questions having the same meaning are input and dissimilar vectors are generated as result values in a case where questions having different meanings are input. Thus, the paraphraser 120 may determine the similarity between the two questions by analyzing the similarity between the vector values generated for each question. Here, the similarity between the vectors may be determined based on how close the distance proximity in a Euclidean space or a value of a cosine similarity is to one.

Figure 10:
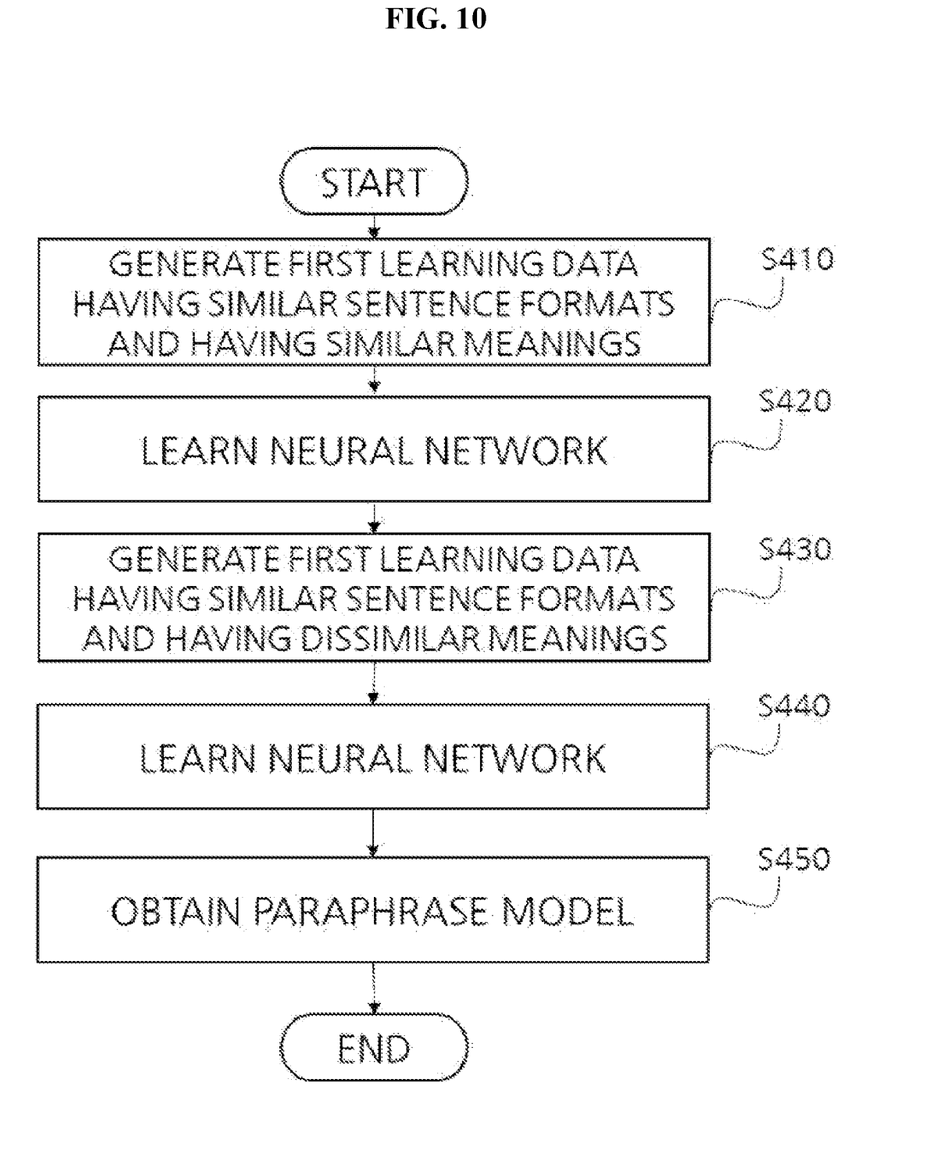
FIG. 10 is a flowchart illustrating a method of generating a paraphrase model by an analysis model generating apparatus according to an exemplary embodiment of the present invention.

FIG. 10 is a flowchart illustrating a method of generating a paraphrase model by an analysis model generating apparatus according to an exemplary embodiment of the present invention. It will be described in the following description that questions constituting learning data are expressed as texts, but according to another exemplary embodiment, the questions constituting the learning data may be expressed as vectors by the encoder described above.

The analysis model generating apparatus according to an exemplary embodiment of the present invention generates first learning data composed of questions configured to have similar words and structures to have similar sentence formats and similar meanings (S410). The first learning data may also include a label indicating that a pair of questions have similar meanings, together with the pair of questions. For example, learning data for learning of paraphrase model may be composed of a pair of questions and a similarity label between the pair of questions. For example, the learning data may be composed of a pair of questions including a first question and a second question and a similarity score between the pair of questions.

Then, the analysis model generating apparatus performs learning of a neural network using the first learning data (S420). The analysis model generating apparatus may check a learning degree using test data according to the progress of the learning and stop the learning in a case where overfitting starts to occur.

Then, the analysis model generating apparatus generates second learning data composed of questions configured to have similar words and structures to have similar sentence forms, but have meanings that are not the same as each other (S430). The second learning data may also include a label indicating that a pair of questions do not have similar meanings, together with the pair of questions.

Then, the analysis model generating apparatus performs learning of a neural network using the second learning data (S440). The analysis model generating apparatus may check a learning degree using test data according to the progress of the learning and stop the learning in a case where overfitting starts to occur.

Meanwhile, the learning of the neural network in step S420 and step S440 is performed with learning data having different labels. The analysis model generating apparatus may learn the neural network without distinguishing between step S420 and step S440 by mixing the first learning data and the second learning data with each other in order to increase efficiency of the learning. The analysis model generating apparatus may use a triplet loss function or the like in order to determine an error value between a predicted value and a result value.

Then, the analysis model generating apparatus inputs test data to the neural network learned as described above. In a case where a predicted value within an error range is generated with respect to the test data, the analysis model generating apparatus may determine that the learned neural network may be used as a paraphrase model (S450).

Hereinafter, a vector-based search method of the server 200 will be described. The server 200 according to an exemplary embodiment of the present invention may store question-answer pairs including questions and answers in the database, and may also store question vectors, which are vector expressions for the questions, together with the questions and the answers in the database. For example, question-answer-question vector pairs may be stored in the database of the server 200. The encoder described above may be used in order to generate the question vector. The server 200 may generate the question vector for the question using the encoder described above.

Figure 11:
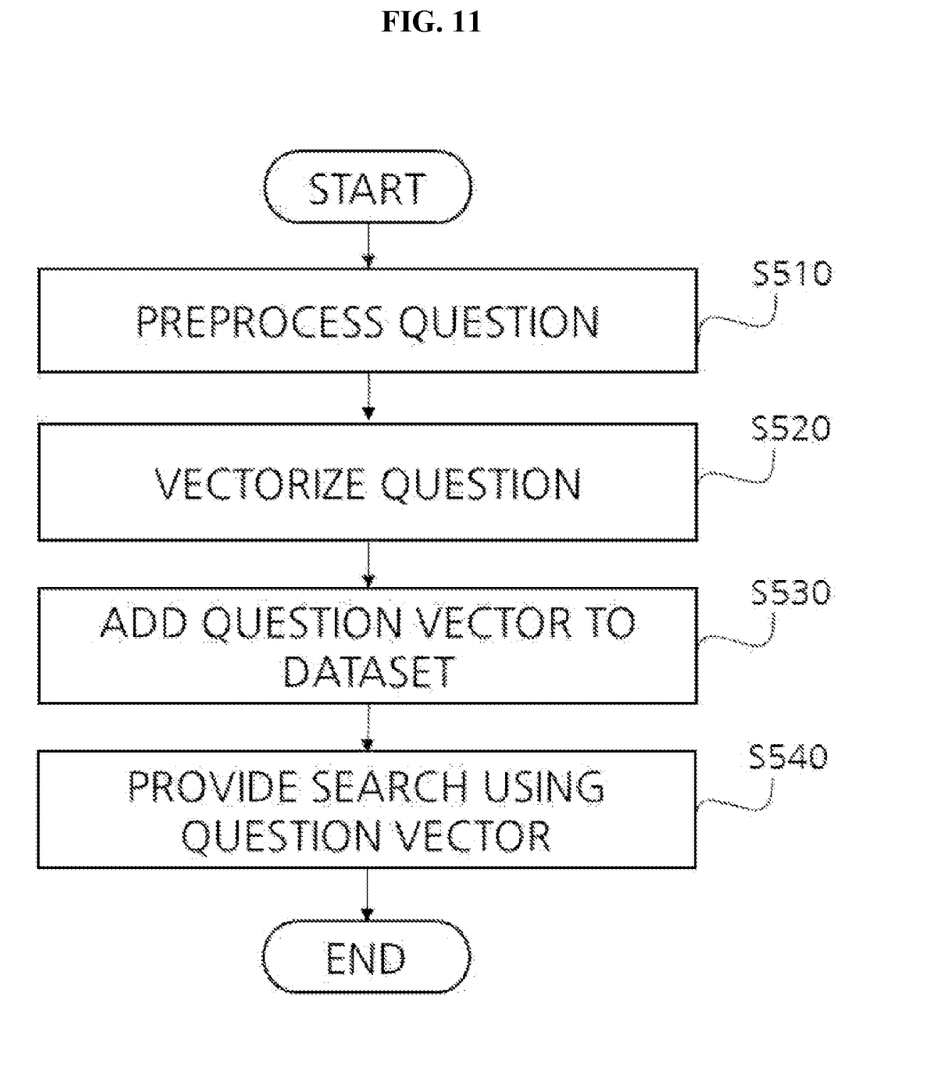
FIG. 11 is a flowchart for describing a vector-based search method of a server.

The vector-based search method of the server 200 will be described in more detail with reference to FIG. 11. The server 200 may preprocess the question (S510). In an exemplary embodiment, all uppercase letters may be converted to lowercase letters. Stopwords may be eliminated. For example, stopwords such as a, an, and the may be removed. In addition, a morphological analysis process may be performed.

Then, the server 200 vectorizes the question (S520). The encoder 110 model described above may be used in order to vectorize the question. The analysis model generating apparatus may generate a vector value of the question using the encoder 110 model.

Then, the server 200 adds a vector to the database (S530). Therefore, the questions, the answers, and the vector values for the questions may be included in the database.

Thus, the server 200 may perform a question search based on the question vector (S540). For example, the server 200 may search for the same question based on a text of a question input by the user, or present a question including a similar keyword based on the text as a search result.

In addition, the server 200 may vectorize the question input by the user, search the database based on the generated vector, and present a question having the same or similar vector value to the user. A similarity between vectors may be determined by a distance in a Euclidean space or a cosine similarity.

Meanwhile, the server 200 may also receive a vector value from the terminal 100. In this case, the server 200 may search the database based on the received vector value and provide a pair of question having the same or similar vector value and answer to the question to the terminal 100.

The search method according to an exemplary embodiment of the present invention described above may be implemented in a form of program commands that may be executed through various computer means and may be recorded in a computer-readable recording medium. The computer-readable recording medium may include program commands, data files, data structures or the like, alone or in a combination thereof. The program commands recorded in the computer-readable recording medium may be especially designed and configured according to exemplary embodiments or be known to those skilled in a field of computer software. Examples of the computer-readable recording medium include a magnetic medium such as a hard disk, a floppy disk, and a magnetic tape; an optical medium such as a compact disk read only memory (CD-ROM) or a digital versatile disk (DVD); a magneto-optical medium such as a floptical disk; and a hardware platform menu management server 10 specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler.

The present invention provides an effect of presenting a search result for a question similar to a user question to a user. Furthermore, the present invention provides an effect of efficiently selecting similar questions by allowing a search server to select the similar questions based on vectors and provide the similar questions to a search terminal.

Each of the drawings referred to in the description of the exemplary embodiments described above is only an example illustrated for convenience of explanation, and items, contents, and images of information illustrated on each drawing may be modified and displayed in various forms.

Although the present invention has been described with reference to an exemplary embodiment illustrated in the drawings, it is only an example, and it will be understood by those skilled in the art that various modifications and other equivalent exemplary embodiments are possible from the present invention. Accordingly, an actual technical protection scope of the present invention is to be defined by the technical spirit of the following claims.

What is claimed is:

1. A search method performed by an electronic device, the search method comprising:
   acquiring a user question from a user;
   when an answer to the user question is not stored in a database of the electronic device, generating a user question vector for the user question;
   transmitting the user question vector to a server, wherein a database of the server stores one or more question-answer-question vector including a question, a response to the question and a question vector for the question;
   when a plurality of similar question candidates are selected by the server using a first similarity analysis model for determining first similarities between question vectors stored in the server and the user question vector, receiving the plurality of similar question candidates and question vectors corresponding to the plurality of similar question candidates from the server;
   selecting a similar question from among the plurality of similar question candidates by the electronic device using a second similarity analysis model for determining second similarities between the received question vectors and the user question vector;
   requesting a response to the similar question from the server;
   receiving the response to the similar question from the server; and
   providing the similar question and the response to the similar question together to the user,
   wherein the first similarity analysis model and the second similarity analysis model are different analysis models,
   the first similarity analysis model and the second similarity analysis model have different configurations of neural network models or different values of variables included in hidden layers, and
   one of the first similarity analysis model and the second similarity analysis model determines a similarity to the user question vector based on a distance from the user question vector in a Euclidean space.

2. The search method of claim 1, further comprising, when the answer to the user question is stored in the database of the electronic device, providing the answer stored in the database to the user.

3. The search method of claim 1, wherein the generating of the user question vector for the user question comprises vectorizing the user question using an encoder of the electronic device to generate the user question vector, and the encoder of the electronic device includes one of bag of words (BOW), term frequency-inverse document frequency (TF-IDF), document to vector (Doc2Vec), a text embedding encoder, and word to vector (Word2Vec).

4. The search method of claim 1, wherein the other of the first similarity analysis model and the second similarity analysis model determines a similarity to the user question vector based on a cosine similarity.

5. The search method of claim 1, wherein the second similarity analysis model includes a paraphrase model generated by learning a Siamese neural network with first learning data and second learning data, the first learning data includes a first pair of questions and a label indicating that the first pair of questions are similar to each other, wherein the first pair of questions have similar sentence formats due to similar words and structures and include questions having similar meanings, and the second learning data includes a second pair of questions and a label indicating that the second pair of questions are dissimilar from each other, wherein the second pair of questions have similar sentence formats due to similar words and structures but include questions having different meanings.

6. The search method of claim 5, wherein learning of the neural network with the first learning data and learning of the neural network with the second learning data are performed without distinguishment by mixing the first learning data and the second learning data.

7. An electronic device comprising:
a processor; and
a non-transitory memory configured to store instructions executed by the processor,
wherein the processor executes the instructions to:
acquire a user question from a user;
when an answer to the user question is not stored in a database of the electronic device, generate a user question vector for the user question;
transmit the user question vector to a server, wherein a database of the server stores one or more question-answer-question vector including a question, a response to the question and a question vector for the question;
when a plurality of similar question candidates are selected by the server using a first similarity analysis model for determining first similarities between question vectors stored in the server and the user question vector, receive the plurality of similar question candidates and question vectors corresponding to the plurality of similar question candidates from the server;
select a similar question from among the plurality of similar question candidates by the electronic device using a second similarity analysis model for determining second similarities between the received question vectors and the user question vector;
request a response to the similar question from the server;
receive the response to the similar question from the server; and
provide the similar question and the response to the similar question together to the user,
wherein the first similarity analysis model and the second similarity analysis model are different analysis models,
the first similarity analysis model and the second similarity analysis model have different configurations of neural network models or different values of variables included in hidden layers, and
one of the first similarity analysis model and the second similarity analysis model determines a similarity to the user question vector based on a distance from the user question vector in a Euclidean space.

8. A computer-readable recording non-transitory medium in which a computer program executed by an electronic device is recorded, the computer program comprising:
acquiring a user question from a user;
when an answer to the user question is not stored in a database of the electronic device, generate a user question vector for the user question;
transmitting the user question vector to a server, wherein a database of the server stores one or more question-answer-question vector including a question, a response to the question and a question vector for the question;
when a plurality of similar question candidates are selected by the server using a first similarity analysis model for determining first similarities between question vectors stored in the server and the user question vector, receiving the plurality of similar question candidates and question vectors corresponding to the plurality of similar question candidates from the server;
selecting a similar question from among the plurality of similar question candidates by the electronic device using a second similarity analysis model for determining second similarities between the received question vectors and the user question vector;
requesting a response to the similar question from the server;
receiving the response to the similar question from the server; and
providing the similar question and the response to the similar question together to the user,
wherein the first similarity analysis model and the second similarity analysis model are different analysis models,
the first similarity analysis model and the second similarity analysis model have different configurations of neural network models or different values of variables included in hidden layers, and
one of the first similarity analysis model and the second similarity analysis model determines a similarity to the user question vector based on a distance from the user question vector in a Euclidean space.

* * * * *